United States Patent Office 2,958,142
Patented Nov. 1, 1960

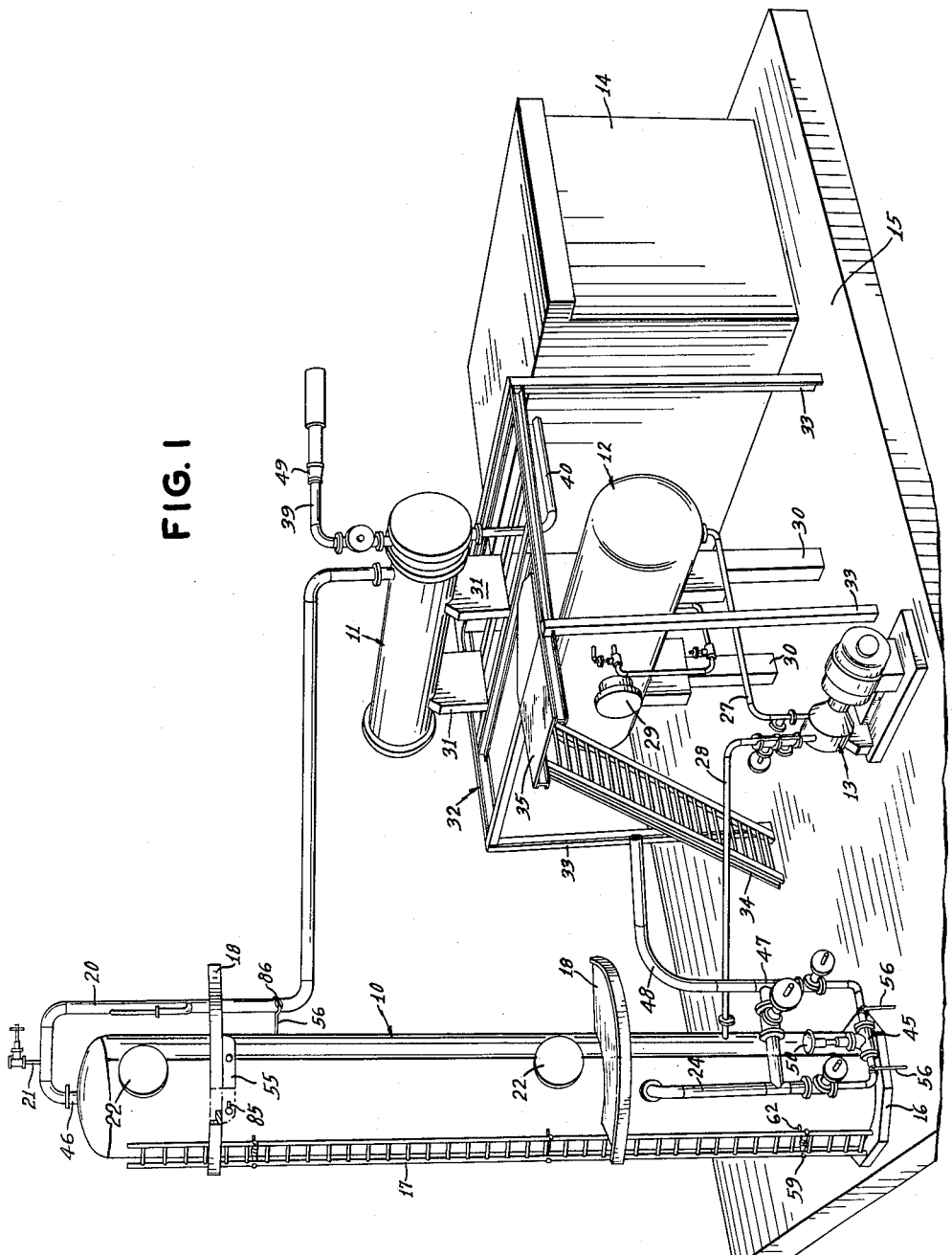

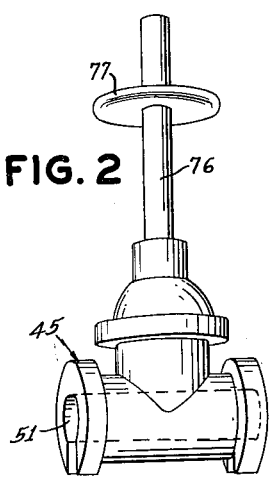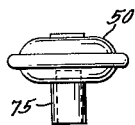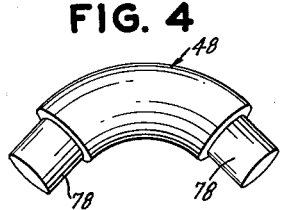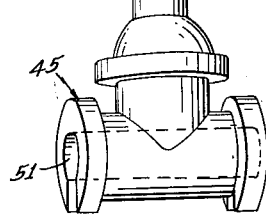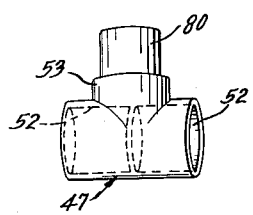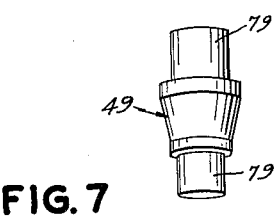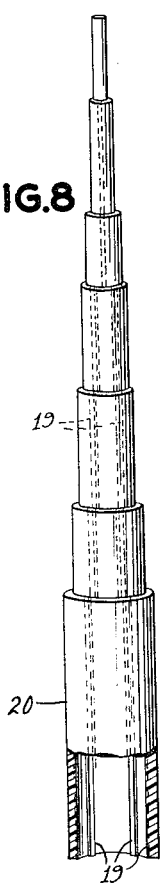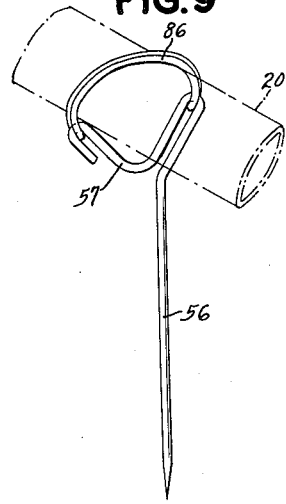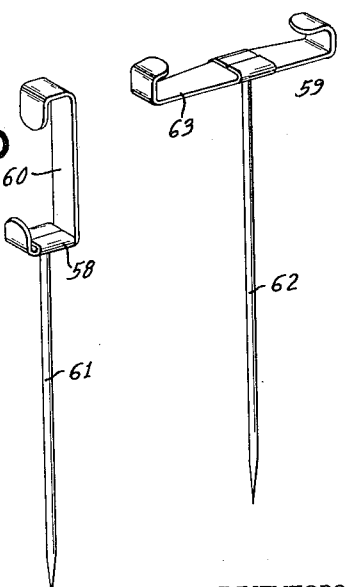

2,958,142

SCALED MODEL AND METHOD OF MANUFACTURE

Harold Kershaw, River Edge, N.J., Edward D. Dowling, Queens Village, N.Y., and Walter S. Miller, Hillsdale, N.J., assignors to The M. W. Kellogg Company, Jersey City, N.J., a corporation of Delaware Filed Jan. 24, 1958, Ser. No. 711,065

12 Claims. (Cl. 35—16)

The present invention relates to models and model making, and particularly to three-dimensional scale models and the making thereof, useful in connection with the planning, the design and the erection of large complicated fluid handling plants such as petroleum refineries, chemical manufacturing, chemical treating plants, and the like.

Plants such as those employed for chemical and petrochemical processing and manufacturing, petroleum refining, etc., wherein large volumes of fluid or fluid-like materials are handled in apparatus elements and circulated through conduits from one to another of such apparatus elements, are often times so complex that it is difficult to envision the total plant from the customary two-dimensional drawings since these present the concepts involved as bits and pieces of many drawings and are of insufficient help in giving complete representation of such concepts and in showing the spatial relationships, clearances, interferences, etc. Because of their great number two-dimensional drawings often times complicate matters particularly when changes and modifications in plan and design are made. Even minor changes frequently involve many drawing changes. As an aid to visualization perspective and isometric drawings have come into use. Such drawings are time consuming to make and thus are expensive. While perspective and isometric drawings are of value in illustrating details and simple setups their value diminishes rapidly as plant complexity rises. Such drawings are not practical as planning and design aids since they can only be made reasonably complete when the plant design is well established. In other words they tend to follow rather than lead planning and design. Perspective and isometric drawings are of value as erection and maintenance aids, but again their value diminishes rapidly as the plant becomes complex.

In recognition of these factors there is an increasing tendency on the part of industrial designers to employ three-dimensional scale models as aids in planning, design and erection of large and complicated processing plants. The worth of suitable scale models as an effective medium for expressing engineering ideas is generally conceded. Components can be presented in their entirety rather than in the bits and pieces of many drawings and may be shown in their true proportions and spatial relationships. Equipment locations, piping, constructural arrangements and placement of control or maintenance equipment can be easily appraised and evaluated. Scaled models for engineering and construction purposes should not be an end in themselves but should serve merely as the design medium similar to the two-dimensional drawings they are intended to replace. The objective is more efficient design of better plants. Scale models as conventionally made are largely tailored-to-measure affairs built by professional model makers piece by piece from appropriate drawings and are usually considered an end in themselves. Thus, these tailored-to-measure models are not well adapted to serve the purposes of original design. The chances that skilled model makers are also skilled engineers and plant designers are remote indeed. The model maker depends on and must follow the designer so that the model cannot come into being before the design is well worked out. Hence, there is no model available for the planning and layout phases of the job. The need for skilled model makers, furthermore, involves considerable loss of designers' and engineers' time, since the model maker must have data and drawings interpreted for him and must be familiarized with the design practices and standards. The mode of procedure in conventional scale model making makes it difficult if not impossible to build the model with sufficient speed to keep up with a skilled designer. Too often models made by conventional procedures are not built until designs have been completed so that most of their potential value as an aid in design is lost.

It is the principal object of this invention to provide for the making of scaled models of plants, largely from preformed, standardized, scaled components by simple procedures that do not involve special knowledge or manipulative skills so that such models can easily be built within the normal plant design organization concurrently with the plant design.

It is a further principal object of this invention to provide for making scaled models largely by the use of preformed, standardized, scaled components that may be quickly and cheaply assembled to embody design concepts so that conventional drawings may be eliminated and the design carried out directly on the model, the preformed components and their manner of assembly and attachment being such that the model may be easily changed and revised as the design progresses and when the design is satisfactorily completed the model components may be permanently joined by simple expedients into a unified structure that completely represents the designed plant and is a master plan thereof from which erection, detailing and planning and material delivery scheduling may be carried out; said master plan model, furthermore, aiding in the erection, operation and maintenance of the plant.

The further objects, advantages and features of the invention will become apparent from a consideration of the following detailed description of a present preferred manner of carrying it out into practice taken with the accompanying drawings, in which Fig. 1 is a perspective view of a scaled model arrangement showing a portion of a petroleum refinery, Figs. 2 to 8 are perspective views showing various pipe line elements employed in the scaled models of the invention, Fig. 9 is a perspective view showing a support arrangement employed in the scaled model of the invention, and Figs. 10 and 11 illustrate two forms of bracket supports employed in the scaled model of the invention.

The novel method and means of the invention for making scaled three-dimensional models are applicable generally to the planning, design and erection of most types of plants wherein fluid or fluid-like materials are treated or processed. The invention finds its greatest use, however, in connection with large complicated plants wherein large volumes of fluid or fluid-like materials are handled in apparatus components and circulated through conduits from one to another of such apparatus components such, for example, as chemical processing and manufacturing plants, petrochemical plants and petroleum refineries. The specific disclosure of this application will be mostly concerned with petroleum refineries as such refineries are probably best illustrative of the plants to which the invention applies.

In order to secure the novel results of the invention to the maximum degree, as many of the model components as possible are preformed by cheap, repetitive, conventional methods and are stocked in sufficient quantities to enable rapid and efficient model construction. Only those components which either because of construction details, size or infrequent use make it necessary, are individually or tailor-made. Even in the latter cases much preformed material is employed as is convenient. The components are so designed and formed that they may be readily assembled and united. Simple push fits and simple pin and screw connections are preferred.

The material out of which the model components are made is of importance, since it must be capable of being formed by cheap, repetitive production methods and yet produce scaled components to close tolerances and when necessary, must be capable of being formed by hand and/or by cheap and rapid machine operations by ordinary artisans to produce the desired components. Plastics are indicated as the material of construction for model components since plastics readily lend themselves to cheap repetitive forming operations which produce articles to close tolerances and are available in such form that the making of components individually becomes a simple task. While a large number of plastics are available, experience has shown that polystyrene is to be preferred. This plastic in the dense form will produce strong, light weight, accurate dimensioned parts by injection molding and by extrusion and is easily colored by a wide range of colors for color coding of the components. Polystyrene is also available as a light weight, foam-like material which can be easily worked with ordinary tools by personnel of limited craftsmanship. Furthermore, polystyrene is available for foam molding to provide strong, light weight components to which other components may be easily attached and united. The ease and security with which polystyrene may be attached to itself in all of its available forms with suitable adhesives or solvents is a distinct advantage and influences its use as a material of construction for model components.

A scaled model arrangement of a portion of a petroleum refinery is shown in Fig. 1. This arrangement is not intended to show any particular plant operation but rather is intended to illustrate typical model components and the manner in which they may be arranged and assembled. The components illustrated include the tower 10, the heat exchanger 11, the storage tank 12, the motor-driven centrifugal pump 13 and the shed or building 14. All of these components are mounted on a suitable board 15. The tower 10 which may be a fractionating tower or a contact tower, or the like, is shown in the upright position and mounted on a platform 16 affixed to the board 15. The tower 10 thus arranged can be considered as including a skirt extending from its bottom end and carried by the platform 16. The ladder 17 is carried by the tower 10. Adjacent the top of the tower 10 is a platform 18, a similar platform 18 is carried by the tower 10 adjacent the lower end thereof. The top of the tower 10 is connected through a pipe line 20 to the heat exchanger 11. A small valved line 21 opens into the line 20. Covered manholes 22 are included in tower 10 in position to be accessible from the platform 18. A line 24 provides exit from the tower below the level of bottom platforms 18 and includes a plurality of valved branches. The pump 13 is connected to the tower 10 by the valved line 28 and to tank 12 by the valved line 27. The tank 12 is carried on suitable pedestal supports 30 and includes a covered manway 29 for access thereinto. The heat exchanger 11 is mounted on suitable supports 31 which are mounted on the platform 32 formed by the structural members 33. A stair 34 is provided for reaching the platform 35 which provides access to the heat exchanger 11. The heat exchange medium is supplied to the heat exchanger 11 through the valved line 39 and is withdrawn therefrom through the line 40. The components may be made to any convenient scale, at present a ⅜″=12″ scale is found satisfactory.

The primary apparatus elements such as the tower 10, the heat exchanger 11, the storage tank 12 and the motor pump set 13 are components which occur over and over again in a petroleum refinery so that these elements can conveniently be made for stock in an assortment of usable scaled sizes and in sufficient quantities to greatly reduce their cost by cheap, repetitive production processes. The size of these primary apparatus elements and the manner in which they are assembled and interconnected make it highly desirable that they be light in weight, sufficiently strong and sturdy that they may be handled and manipulated as required without damaging them and be of such density and texture that secondary elements may be securely attached thereto as by simple pin or screw connections which are effected solely by hand. It has been found that these ends may amply be attained by making these primary apparatus elements by foam molding. For this purpose a polystyrene pellet capable of being expanded by heating into foam material, is placed in a suitable low pressure mold and expanded by steam to fill the cavity of the mold. This operation causes the pellet to form into a polystyrene foam which is essentially made up of a plurality of discrete bubbles of approximately uniform size throughout the cross-section of the molded article. A characteristic of the molded polystyrene foam article is that it includes a skin or a peripheral depth of relatively greater density, toughness and strength which supports and protects the weaker central material and will hold a screw connection or a pin firmly in position. The thickness of the tougher peripheral material is controlled by controlling the initial quantity of the expandable polystyrene placed in the mold and the temperature employed for expansion. It is found at present that if the operation is carried out in the manner to produce these primary apparatus elements with an average density of about 10 lbs. per cubic foot all of the above requirements are satisfied.

In addition to the primary apparatus elements above set forth, secondary apparatus elements and auxiliary components may likewise be foam molded. Thus, the pedestals 30 and 31, the tower platforms 18, transition cones (not shown) and similar, may be foam molded. The platforms 18 are formed as a complete annulus and are cut in sections to suit the requirements of the particular application. As shown in Fig. 1 these platforms are cut to segments of about 135°.

The pedestals 31 may be formed integrally with the heat exchangers 11 or may, if desired, be separately molded. Towers and tanks such as tower 10 and tank 12, are formed in a series of scaled diameters and lengths and preferably with suitably shaped ends. The length of any tower, or tank, may be extended by cutting off one end thereof and adding thereto the appropriate length from another tower or tank. Similarly the length may be shortened by removing a mid-portion. When thus used the component simulates a tank such as tank 12 of Fig. 1. When the towers are mounted as is tower 10 in Fig. 1, the bottom shaped end may be cut away so that the lower end of the tower represents a supporting skirt. In forming the foam molded towers and tanks the line which results from the split in the mold along the length thereof and the lines which result at the ends of the towers and tanks where the cylindrical body surface meets the shaped end surface are allowed to remain as these lines provide desirable reference lines for accurately locating pipe nozzles, manways, platforms, etc., on the tower or tank.

Many refinery components are of such a nature as to preclude cheap, repetitive manufacture of their models, as for instance the building or shed 14 of Fig. 1. Such components are likewise made of foam material as for instance polystyrene foam. This material is readily available and is preferred in densities of about 4.7 lbs. per cubic foot and in planks of various sizes as for instance 3" x 12" x 36". To make the building 14 such planks are cut to size by ordinary woodworking techniques in a simple, easy manner by the drafting room personnel assigned to model making. This polystyrene foam is an essentially homogeneous material and does not evidence grain in any direction nor will it split as wood does, however, it is necessary to avoid overheating while cutting, sawing, etc., as it will readily melt. From the polystyrene planks mentioned towers of unusual size, whether length, diameter or otherwise, may easily be made by turning operations.

Certain of the secondary apparatus components as for instance the valve 45 of Fig. 1, as well as the pipe nozzle 46, the pipe T 47, the pipe elbow 48 and similar parts are injection molded using the high impact form polystyrene plastic as the material for construction. Injection molding is a well established commercial process and even though the present preferred tolerance of plus or minus 0.0005 inch is quite severe, with careful operations this tolerance is attained. The various injection molded pipe line parts and fittings are preferably stocked in sizes corresponding to the full range of sizes of pipe to be employed in the model and colored in various colors to facilitate color coding of pipe lines in the scale model.

The straight runs of the piping 20, 27, 28, 39, etc., the ladder 17, the stair 34 and the structural members 33 are produced by an extrusion operation employing the high impact form polystyrene plastic as the material of construction. The piping is produced in various colors to make possible proper color coding of the pipe lines handling the various fluids circulated through the plant. The extrusion of these components is performed by conventional methods which are well known and need not be specifically described. The extruded tubing is made in diameters ranging from 1/16 of an inch to 3/4 of an inch and so graded in outside diameters that each size fits snugly into the next largest size. The corresponding injection molded pipe fittings are so sized that they accommodate the tube sizes both inside and out with snug push fits. The problem of fit between the pipe fittings and the tubes is solved by holding the injection molded pipe fittings to precise dimensions, plus or minus 0.0005 inch, and then controlling the extrusion sizes by the character of the fit. Longitudinal ribs 19, four or more in number are provided on the inside of the tubes, see Fig. 8, make possible the provision of push fits involving both the inside and the outside dimensions.

In forming the ladder 17 the original extrusion is in the form of a pair of side rails connected by a comparatively thin central web. Subsequently the web is punched to remove the material between the rungs. In forming the stair 34 the original extrusion includes end channels connected by a thin web which forms a continuation of corresponding webs of the channels. After extrusion the connecting web is punched to dispose the material to the proper angle for tread formation.

The pipe fittings of the pipe lines 20, 27, 38, etc., for instance the nozzle 46, the elbow 48, the T 47, the reducer 49 and the valve pressure actuator 50 are formed as injection type pressure moldings. In use these fittings and similar elements, are positioned in the various pipe lines as required and are held in place by the friction fits between them and the associated pipe line members. When permanency is required, the various joints may be sealed by a suitable solvent adhesive. For joints involving high impact, polystyrene moldings and extrusions, methylene chloride is a suitable solvent adhesive; whereas "Rez-N-Glue" sold by the Schwartz Chemical Company is suitable as an adhesive for joints in the foam materials. Glues such as "Elmers' Glue-All" sold by the Borden Company are suitable adhesives for joints between the foam material and wood.

As shown in Fig. 2 the valves 45 have a longitudinal groove 51 of U section formed in the lower end of the valve body. When assembled the groove 51 straddles the pipe section so that the valve 45 may be properly positioned at any point along the pipe line without breaking any portion of such pipe line. The valve 45 may include the actuator 50 to designate a pressure or otherwise automatically operated valve. The actuator 50, Fig. 3, includes a hollow stem 75 which is adapted to be placed over the end of the stem 76 of the valve 45 after the upper end of the stem 76 is broken off to remove the manual actuator 77. As shown in Figs. 4 and 6, the elbow 48 and the reducer 49 are solid throughout and include appropriately sized cylindrical plugs 78 and 79 at their ends for insertion into pipe ends for pipe line formation. As shown in Fig. 5, the T 47 has a hollow run 52 into whose ends may be inserted solid plug members or hollow pipe ends of appropriate size. The other branch 53 of the T 47 includes a solid cylindrical plug 80 adapted to fit in a pipe end. The pipe nozzle 46, Fig. 7, includes cylindrical plug members 81 and 82 which are separated by the circular flange 83. The plug 81 is adapted to be housed in a pipe end or other hollow member of suitable size for pipe line formation. The exposed face of the plug 82 is adapted to bear against the surface of the model componet, such as the tower 10, that forms the terminus of the pipe line. The nozzle 46 is cored from the plug 82 side to receive the striated end of the screw 54. The screw 54 is screwed, as by hand, into the appropriate member as for instance the tower 10, for holding the nozzle 46 snugly in position. Manways 22 and similar elements are likewise held in position by similar screw connections. Fig. 8 shows a plurality of nested pipe lengths illustrating the manner in which the sizes snugly fit one within the other and the manner in which the ribs 19 assure a smooth snug fit.

Simple arrangements are employed for attaching the various elements. Thus, the platforms 18 which include a flange 55 are held in position on the tower 10 by pins, such as straight bankers pins 85 which pass through the flange 55 and extend into the foam structure of the tower 10. The various pipe lines and pipe runs are conveniently held in position relative to the primary model components by the arrangement shown in Fig. 9. This support arrangement consists of a straight pin 56 with its head end portion formed by reverse bending to provide a cradle structure 57 upon which the pipe element, for example a portion of the line 20, is held firmly in position by a small rubber band 86 which surrounds the pipe element 20 and is hooked into the bent ends of the cradle structure 57. Various pin lengths may be provided to accommodate varying offsets from the pipe supporting element, as for instance tower 10. One head 57 will hold the full range of tubing sizes.

The ladder 17 is conveniently held in position by brackets. Two types of brackets are shown. One, the bracket 58 of Fig. 10 for holding the ladder with its rungs parallel to a diametrical line passing through the shell of the tower 10 and the other, the bracket 59 of Fig. 11 for holding the ladder with its rungs in a plane parallel to the plane that includes the longitudinal axis of the tower 10 and spaced about 180° from said ladder. Each of the brackets 58 and 59 includes a straight pin which is pushed into the tower to be held firmly in position thereby. At the head end of the pin is a stamped strip blank. In the case of the bracket 58 one end of the blank 60 is positioned adjacent the head of the pin 61; whereas in the bracket 59 the pin 62 passes through the middle of the blank 63. After the respective pins are positioned the ends of the respective blanks are crimped to encircle the ladder and hold it firmly against movement.

While pipe ends are generally connected through conventional pipe fittings such as elbows, T's, etc., it is also possible to connect pipe members directly as for instance the small pipe line 21, Fig. 1, is passed through a hole of appropriate size formed in the run of the pipe 20 and held in position relative thereto by a suitable adhesive joint. Also pipe reduction may be made directly as shown in the line 39 by placing one pipe end within a pipe end of next larger diameter and adhesively connecting the two.

Having thus described my invention by reference to a specific application, it should be understood that no undue limitations or restrictions are to be imposed by reason thereof, but that the scope of the invention is defined by the appended claims.

We claim:

1. A scaled model of an apparatus installation comprising a primary model component formed of expanded cellular plastic material, said model component having a form defining skin of comparatively dense, wear resistant material filled with weaker material of comparatively coarse cellular structure, and a secondary model component formed of molded plastic material said secondary model component including an elongated insertable element attached thereto and extending therefrom, said insertable element having an end of screw formation inserted into said primary component and an opposite end of spline formation housed in said secondary component to firmly position said secondary component relative to said primary component.

2. A scaled model of an apparatus installation comprising a primary model component formed of expanded cellular plastic material, said model component having a form defining skin of comparatively dense, wear resistant material filled with weaker material of comparatively coarse cellular structure, a secondary model component formed of molded plastic material positioned on said primary component, said secondary component formed with a cylindrical protuberance extending away from said primary component, insertable means extending into said primary component and attached to said secondary component firmly positioning said secondary component on said primary componnt, a pipe line component including a straight tubular section and an end member having a cylindrical cavity snugly receiving said cylindrical protuberance to attach said pipe line component to said secondary component, a valve model component mounted on said straight section, said valve component having a longitudinal groove of U section therein snugly receiving said straight section.

3. A scaled model of an apparatus installation as defined in claim 2, in which said valve component includes a stem and an actuator model component having a hollow element housing the end of said stem to mount said actuator on said valve.

4. A scaled model of an apparatus installation comprising a tower model formed of expanded cellular plastic material, said tower model having a form defining skin of comparatively dense, wear resistant material filled with weaker material of comparatively coarse cellular structure, said tower model including a cylindrical body portion and shaped non-planar head portions, said skin including at least one longitudinal rib running the length of said cylindrical portion and parallel to the longitudinal axis thereof and an annular rib in a plane transverse to said axis separating said cylindrical body portion from the contiguous head portion, a secondary model component formed of molded plastic material positioned on said tower component, said secondary component including insertable means extending into said primary component and attached to said secondary component, said ribs serving as datum lines for accurately locating said secondary component on said tower component.

5. A scaled model of an apparatus installation comprising a tower model formed of expanded cellular plastic material, said tower model having a form defining skin of comparatively dense, wear resistant material filled with weaker material of comparatively coarse cellular structure, said tower model including a cylindrical body portion and shaped non-planar head portions, said skin including at least one longitudinal rib running the length of said cylindrical portion and parallel to the longitudinal axis thereof, said skin also including an annular rib separating said cylindrical body portion from the contiguous head portion, a platform model component formed of expanded cellular plastic material mounted on said tower component, said platform model having a form defining skin of comparatively dense, wear resistant material filled with weaker material of comparatively coarse cellular structure, said platform model a segment of an annulus and having an inner dependent flange bearing against said tower model, and pin means passing through said flange and into said tower model attaching said platform model to said tower model, said ribs serving as datum lines for accurately locating said platform model on said tower model.

6. A scaled model of an apparatus installation comprising a normally vertically disposed tower model formed of expanded cellular plastic material, said tower model having a form defining skin of comparatively dense, wear resistant material filled with weaker material of comparatively coarse cellular structure, said tower model including a cylindrical body portion and shaped non-planar head portions, a ladder model component of extruded plastic material spaced from said tower model and positioned parallel to the longitudinal axis of said tower model with its rung elements disposed in a plane including said axis, means attaching said ladder model to said tower model, said attaching means including a pin member having its pointed end inserted into said tower model, the opposite end of said pin having attached a strip member attached thereto, said strip member having its ends bent around the rails of said ladder model to hold said ladder model in position.

7. A scaled model of an apparatus installation comprising a normally vertically disposed tower model formed of expanded cellular plastic material, said tower model having a form defining skin of comparatively dense, wear resistant material filled with weaker material of comparatively coarse cellular structure, said tower model including a cylindrical body portion and shaped non-planar head portions, a ladder model of extruded plastic material spaced from said tower model and positioned parallel to the longitudinal axis of said tower model with its rung elements disposed parallel to a plane including said axis, means attaching said ladder model to said tower model, said attaching means including a pin member having its pointed end inserted into said tower model, the opposite end of said pin attached intermediate the ends of a strip member, said strip ends bent around the rails of said ladder model to hold said ladder model in position.

8. A scaled model of an apparatus installation comprising a first model component, said first component formed with a protuberance extending away therefrom adapted to be connected to said first component, said second component having a portion thereof formed as a hollow cavity to receive the protuberance of said first component, the walls defining said hollow cavity including a plurality of spaced longitudinal rib formations extending along the length of said cavity inwardly from the internal surface thereof and adapted to form a tight joint between the walls defining said hollow cavity and the protuberance of said first component.

9. A scaled model of an apparatus installation comprising a pair of spaced apart primary model components, each of said primary components having positioned thereon a secondary model component formed with a cylindrical protuberance extending away from its respective primary component, a pipeline model component connecting said secondary components, each end of said pipeline component formed as a hollow tubular member having a plurality of radially spaced longitudinal rib formations extending from the internal surface thereof, each tubular member adapted to snugly fit over the respective adjacent protuberance to interconnect said pipeline to said secondary components, said rib formations adapted to aid in forming a tight joint between said tubular members and said protuberances.

10. A scaled model of an apparatus installation comprising a primary component formed of easily penetrable material, a secondary component formed of comparatively difficultly penetrable material positioned adjacent said primary component, and insertable means extending into said primary component and engaging said secondary component to maintain said secondary component in a predetermined position relative to said primary component, said insertable means including a pin member having a pointed end extending into said primary component and an external end bent into a cradle structure including oppositely disposed hooks and a resilient member engaging said hooks and said secondary component to hold such secondary component against said cradle structure.

11. A scaled model of an apparatus installation comprising a primary model component formed of easily penetrable material, a secondary model component formed of comparatively difficultly penetrable material positioned adjacent said primary component, means for maintaining said secondary component in a predetermined position relative to said primary component, said position maintaining means including a pin member having a pointed end extending into said primary component and an opposite external end provided with a head element adapted to contact said secondary component to limit the movement thereof in a direction toward said primary component, and a thin strip member attached to said head element and bent around said secondary component to the degree required to hold said secondary component in said predetermined position relative to said primary component.

12. A scale model of an apparatus installation comprising a first model component, said first component formed with a protuberance extending away therefrom, a second model component adapted to be connected to said first component, said second component having a portion thereof formed as a hollow cavity to receive the protuberance of said first component in joint forming relation, one of said protuberance and hollow cavity including a plurality of spaced longitudinal rib formations projecting from the joint forming surface thereof in a direction to engage the joint forming surface of the other of said protuberance and hollow cavity, said rib formations extending longitudinally along said one of said protuberance and hollow cavity and adapted to form a tight joint between the walls defining said hollow cavity and said protuberance.

References Cited in the file of this patent
UNITED STATES PATENTS

| | | |
|---|---|---|
| 407,118 | Robinson | July 16, 1889 |
| 2,284,458 | Van Antwerp | May 26, 1942 |
| 2,523,508 | Ledgett | Sept. 26, 1950 |
| 2,618,901 | Braun | Nov. 25, 1952 |
| 2,657,096 | Holmes | Oct. 27, 1953 |
| 2,738,584 | Parker | Mar. 20, 1956 |
| 2,767,436 | Noland | Oct. 23, 1956 |
| 2,774,181 | Cowen | Dec. 18, 1956 |